2,806,030
CYCLOPENTANOPHENANTHRENE DERIVATIVES AND PROCESS FOR THE PREPARATION THEREOF

Howard J. Ringold, Franz Sondheimer, and George Rosenkranz, Mexico City, Mexico, assignors to Syntex S. A., Mexico City, Mexico, a corporation of Mexico No Drawing. Application March 16, 1955,
Serial No. 494,817
Claims priority, application Mexico March 20, 1954
3 Claims. (Cl. 260—239.55)

The present invention relates to novel cyclopentanophenanthrene derivatives and to a novel process for the preparation thereof.

More particularly, the present invention relates to the preparation of the active, known hormone nor-ethinyl-testosterone ($\Delta^4$-19-nor-17$\alpha$-ethinyl-androstene-17$\beta$-ol-3-one) and to certain novel intermediates for the preparation of this compound.

In a recent publication of Hertz, Tullner and Raffelt (Endocrinology, 54, 228, 1954) it was indicated that 19-nor-ethinyl-testosterone has a leutinizing oral activity approximately five times as great as that of the corresponding ethinyl-testosterone which is provided with the angular methyl group at C–19.

In U. S. Patent No. 2,655,518, there has been described a method for the preparation of nor-ethinyl-testosterone which involves as one of the steps the oxidation of 3-methoxy-19-nor-$\Delta^{2,5(10)}$-androstadiene-17$\beta$-ol to the corresponding 3-methoxy-17-ketone which is then treated with acetylene in order to form nor-ethinyl-testosterone. One of the difficulties involved in practicing this method is that it involves the oxidation of a compound which is doubly unsaturated in ring A. As a result, therefore, this type of oxidation is accompanied by a high percentage of aromatization in ring A which lowers the yield of the $\Delta^{2,5(10)}$ compounds which are subsequently re-arranged to the $\Delta^4$-3-ketones.

In accordance with the present invention, there has been discovered a novel method for the production of nor-ethinyl-testosterone which involves the reduction of the lower alkyl-ether of estradiol with an alkali metal in liquid ammonia as a first step. The 3-lower alkoxy-19-nor-$\Delta^{2,5(10)}$-androstadiene-17$\beta$-ol, obtained as a result of the first step process, is then treated with ethylene glycol in the presence of an acid catalyst in order to form the corresponding ketal of 19-nor-testosterone. The ketal of 19-nor-testosterone thus obtained is then subjected to oxidation in accordance with the present invention, to give in high yield the corresponding ketal of 19-nor-androstene-3,17-dione which is then reacted with acetylene to form the desired 19-nor-ethinyl testosterone. There is, therefore, also prepared in accordance with the present invention the novel intermediates, the 3-ethylene-ketal of 19-nor-testosterone and the 3-ethylene-ketal of 19-nor-androstene-3,17-dione.

The following equation serves to illustrate the process of the present invention:

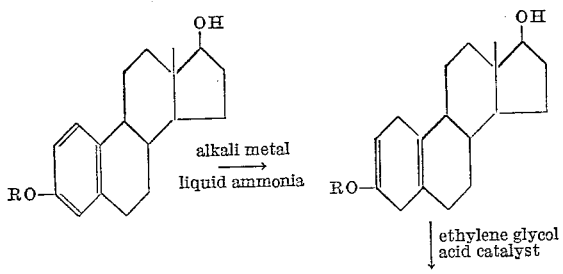

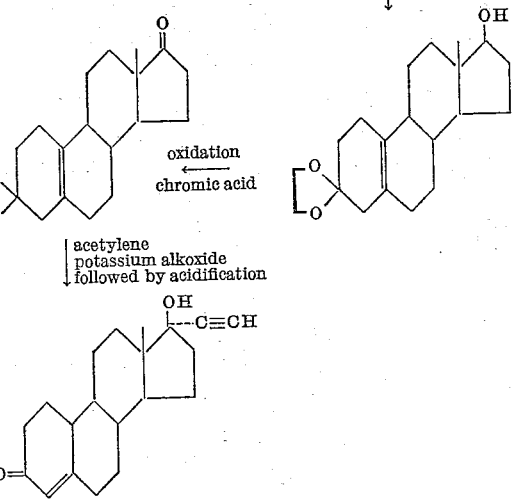

In the above equation R represents a lower alkyl group such as methyl or ethyl.

In practicing the process above outlined, a 3-lower-alkyl-ether of 17$\beta$-estradiol such as the 3-methyl ether is dissolved in a suitable inert organic solvent such as Dowanol 33, a glycol monoether. The solution is cooled and then added to anhydrous liquid ammonia. Thereafter an alkali metal such as lithium metal in the form of wire is added and the reaction mixture is stirred until the blue color has disappeared. This took a period of time of the order of one hour. Water is then added and the ammonia and solvent evaporated under a vacuum. After purification to a limited extent, crude 3-lower-alkoxy-19-nor-$\Delta^{2,5(10)}$-androstadien-17$\beta$-ol is produced which can be used without further purification.

For the next step of the process of the present invention a 3-lower-alkoxy-19-nor-$\Delta^{2,5(10)}$-androstadien-17$\beta$-ol is dissolved in a suitable inert inorganic solvent such as benzene and mixed with ethylene glycol together with an acid catalyst such as p-toluenesulfonic acid. The mixture is then refluxed for a period of approximately one day with continuous removal of the water formed during the reaction. The ethylene ketal of 19-nor-testosterone thus produced is then recovered. Although in the above equation, the double bond of this ketal is indicated in the 5(10) position, the exact position of the double bond has not been clearly defined and the double bond could obviously also be at the position 4–5 or at position 5–6 of the molecule.

For the third step of the instant process the ethylene ketal of 19-nor-testosterone is oxidized with an oxidizing agent capable of converting secondary hydroxyl groups to keto groups. Preferably, the oxidizing agent is chromic acid in suspension in anhydrous pyridine. The ethylene ketal of 19-nor-testosterone is also dissolved in a suitable solvent such as pyridine and the mixture of the steroid and chromic acid is kept for approximately one day at room temperature. Substantially quantitative yields were obtained of the corresponding ethylene ketal of 19-nor-androstene-dione. The ethylene ketal of 19-nor-androstene-dione is then dissolved in a suitable solvent such as anhydrous toluene and mixed with potassium metal previously dissolved in anhydrous lower alcohol such as tertiary amyl alcohol. Preferably, the potassium metal was dissolved in the anhydrous tertiary amyl alcohol with a small amount of heating and under atmosphere of nitrogen. A stream of nitrogen is then passed through the mixture for a short time and then a stream of substantially pure acetylene is passed into the reaction mixture for a period of time of the order of 15 hours. The mixture is then poured into water, acidified with a suitable acid such as concentrated hydrochloric acid to pH of approximately 1, refluxed for a short period on a steam bath and the solvents removed by steam distillation. The resultant product 19-nor-ethinyl-testosterone is then purified.

The following specific examples serve to illustrate but are not intended to limit the present invention:

Example I 20 g. of the 3-methyl ether of 17β-estradiol was dissolved in 600 cc. of distilled Dowanol 33, the solution was cooled in ice and slowly added to 1400 cc. of anhydrous liquid ammonia. Then 20 g. of lithium metal in the form of wire was added as rapidly as possible and controlling the reaction so not much foam was formed. The reaction mixture was kept under stirring until the blue color disappeared (approximately 1 hour), 3 lt. of water was cautiously added and the ammonia and Dowanol were evaporated under vacuum. After cooling, the precipitate was collected, dissolved in hot benzene and filtered to remove lithium salts. The benzene solution was washed thrice with water, dried with anhydrous sodium sulfate and evaporated to dryness under vacuum, thus yielding 20 g. of crude 3-methoxy-19-nor-$\Delta^{2,5(10)}$-androstadien-17β-ol which was used without further purification for the experiment described in Example II.

Example II 7.6 g. of 3-methoxy-19-nor-$\Delta^{2,5(10)}$-androstadien-17β-ol was dissolved in 137 cc. of benzene and mixed with 29 cc. of ethylene glycol previously distilled over potassium hydroxide and 1.52 g. of p-toluenesulfonic acid and the mixture was refluxed for 20 hours with the use of an attachment for the continuous removal of the water formed during the reaction. At the end of 20 hours, the mixture was neutralized with saturated sodium bicarbonate solution, washed with water until neutral, dried with anhydrous sodium sulfate and evaporated to dryness under vacuum, thus affording 8.5 g. of the ethylene-ketal of 19-nor-testosterone, which was used without further purification for the experiment described in Example III.

Example III 4.83 g. of the ethylene-ketal of 19-nor-testosterone dissolved in 35 cc. of anhydrous pyridine was mixed with a suspension of 4.83 g. of chromic acid in 35 cc. of anhydrous pyridine, suspension which had been prepared by the addition in four portions of the powdered chromic acid to the pyridine until disappearance of the characteristic dark red color of chromic acid, and maintaining the temperature below 35° C. by cooling in ice. The mixture was kept for 20 hours at room temperature, diluted with ethyl acetate, filtered over celite and the solution was washed with water until the washings were colorless. The solution was then dried over anhydrous sodium sulfate and evaporated to dryness, thus giving 4.26 g. of the ethylene-ketal of 19-nor-androstenedione which was used without further purification for the experiment described in Example IV.

Example IV 6.28 g. of the ethylene-ketal of 19-nor-androstenedione was dissolved in 150 cc. of anhydrous toluene and mixed with a solution of 6.28 g. of potassium metal in 150 cc. of anhydrous tertiary amyl alcohol which was made with slight heating under an atmosphere of nitrogen. A stream of nitrogen was passed through the mixture for 15 minutes and then a stream of previously washed acetylene was passed for 15 hours, at the end of which the mixture was poured into water, acidified with concentrated hydrochloric acid to pH 1, refluxed for half an hour on the steam bath and the solvents were removed by steam distillation. The solid product was filtered from the cooled mixture to give 5.28 g., which by recrystallization from ethyl acetate and chromatography of the mother liquors in a column with washed alumina yield 3.4 g. of 19-nor-ethinyl-testosterone with M. P. 204–205° C.

We claim:

1. A process for the production of $\Delta^4$-19-nor-17α-ethinyl-androstene-17β-ol-3-one comprising reacting a 3-lower alkoxy-19-nor-$\Delta^{2,5(10)}$-androstadiene-17β-ol with ethylene glycol in the presence of an acid catalyst to form the corresponding 3-ethylene-ketal of 19-nor-testosterone, treating the aforementioned ketal with chromic acid to form the 3-ethylene-ketal of 19-nor-androstenedione, and treating the last mentioned compound with acetylene in the presence of a potassium alkoxide followed by acid hydrolysis.

2. A process for the preparation of the 3-ethylene-ketal of 19-nor-testosterone which comprises reacting a 3-lower-alkoxy-19-nor-$\Delta^{2,5(10)}$-androstadiene-17β-ol with ethylene glycol in the presence of an acid catalyst.

3. The process of claim 2 wherein the acid catalyst is p-toluene sulphonic acid.

References Cited in the file of this patent

UNITED STATES PATENTS

| | | |
|---|---|---|
| 2,288,854 | Stavely | July 7, 1942 |
| 2,356,154 | Fernholz | Aug. 22, 1944 |
| 2,378,918 | Fernholz | June 26, 1945 |
| 2,623,885 | Miescher | Dec. 30, 1952 |
| 2,655,518 | Colton | Oct. 13, 1953 |
| 2,739,974 | Colton | Mar. 27, 1956 |